United States Patent
Wilczynski (10) Patent No.: US 8,721,210 B2
(45) Date of Patent: May 13, 2014

(54) COSMETIC MULTI-LAYERED WIPER

(75) Inventor: Robert John Wilczynski, Perth Amboy, NJ (US)

(73) Assignee: HCT Asia Ltd, Central (HK)

( * ) Notice: Subject to any disclaimer, the term of this patent is extended or adjusted under 35 U.S.C. 154(b) by 685 days.

(21) Appl. No.: 12/949,118

(22) Filed: Nov. 18, 2010

(65) Prior Publication Data

US 2012/0128401 A1    May 24, 2012

(51) Int. Cl.
    *A46B 17/08*    (2006.01)
(52) U.S. Cl.
    USPC .......................................... 401/122; 401/121
(58) Field of Classification Search
    USPC ........................... 401/121, 122, 126, 128–130
    See application file for complete search history.

(56) References Cited

U.S. PATENT DOCUMENTS

| | | |
|---|---|---|
| 4,194,848 A | 3/1980 | Kingsford |
| 4,433,928 A | 2/1984 | Kingsford |
| 4,470,425 A | 9/1984 | Gueret |
| 5,332,325 A | 7/1994 | Crosnier et al. |
| 5,743,279 A | 4/1998 | Gueret |
| 6,168,334 B1 | 1/2001 | Fordham |
| 6,305,861 B1 | 10/2001 | Gueret |
| 6,502,584 B1 | 1/2003 | Fordham |
| 6,505,631 B2 | 1/2003 | Fischer et al. |
| 7,223,034 B2 | 5/2007 | Hiyama |
| 8,142,093 B2 * | 3/2012 | Vanoncini ..................... 401/122 |
| 2004/0184865 A1 | 9/2004 | Carroll |
| 2005/0175394 A1 | 8/2005 | Gueret |
| 2005/0286965 A1 | 12/2005 | Dumler |
| 2007/0079845 A1 | 4/2007 | Gueret |
| 2008/0115798 A1 | 5/2008 | Rainey et al. |

\* cited by examiner

*Primary Examiner* — David Walczak
(74) *Attorney, Agent, or Firm* — Lee & Hayes, PLLC (57) ABSTRACT

A multi-layered wiper for removing a product (e.g., a cosmetic product) from an applicator. The multi-layered wiper comprises a wiping body having a wiping face, an acute wiping tip, and vertical slits, formed of a first material, over-molded to a retention body, formed of another material harder than the first material. By virtue of having a multi-layered wiper comprising a wiping body, formed of a first material, over-molded to a retention body, formed of another material, harder than the first material, the multi-layered wiper is capable of providing exceptional installation characteristics, while simultaneously providing exceptional wiping characteristics.

19 Claims, 7 Drawing Sheets

COSMETIC MULTI-LAYERED WIPER

BACKGROUND

Wipers exist for removing cosmetic or medicinal products from applicators. Existing wipers are typically formed of a single material, and are configured to be retained by a cosmetic dispenser (e.g., a bottle), while also being configured to remove product from an applicator. Existing mascara wipers, formed of a single material, are designed to be pliable enough to provided interference between the wiper and an applicator to remove mascara from the applicator while being hard enough to be easily installed in a bottle such that the wiper is retained in the bottle during use (e.g., installed in a bottle by a snap fit). For example, existing wipers are typically formed of a single material having a hardness (i.e., durometer) that provides for snap fitting into a bottle, while at the same time being supple enough to remove mascara from a brush.

However, because existing wipers formed of a single material must compromise between providing an adequately supple wiping surface, while at the same time, providing an adequately stiff retaining surface, they do not perform either function well. Accordingly, there remains a need in the art for improved wipers that provide installation characteristics, while simultaneously providing wiping characteristics.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This application describes multi-layered wipers formed of a first material, and another material, softer than the first harder material. Generally, the multi-layered wipers comprise a retention body formed of the first harder material, over-molded or insert molded to a wiping body formed of the other softer material. The retention body being formed of the first harder material is for fixing the multi-layered wiper to a bottle of a dispenser, while the wiping body formed of the other softer material is for removing a portion of a product (e.g., a cosmetic product such as mascara, lip gloss, nail polish, or the like) from an applicator (e.g., a brush, sponge, stick, pick, or the like).

In one embodiment, the wiping body comprises a wiping face that is a vertical wiping surface. In another embodiment, the wiping body comprises a wiping face that has a raised ridge protruding towards a center of the wiping body. The wiping bodies may comprise an acute wiping tip arranged around a circumference of an opening of the wiping bodies. Further, the wiping bodies may also comprise vertical slits that are cut in the wiping faces. The vertical slits may be arranged uniformly around a circumference of the wiping face. In one embodiment, the vertical slits may be cut in the wiping body, such that the vertical slits are symmetrical. For example, where the vertical slits comprise a first edge cut in the wiping face, and another edge, equal in length to the first edge, cut in an outer surface of the wiping body. In another embodiment, the vertical slits may be cut in the wiping body, such that the vertical slits are asymmetrical. For example, where the vertical slits comprises a first edge cut in the wiping face, and another edge shorter than the first edge cut in the outer surface of the wiping body. By virtue of having multi-layered wipers, wipers according to this disclosure are configured to provide exceptional installation characteristics, while simultaneously providing exceptional wiping characteristics.

Illustrative Multi-Layered Wiper

Figure 1:
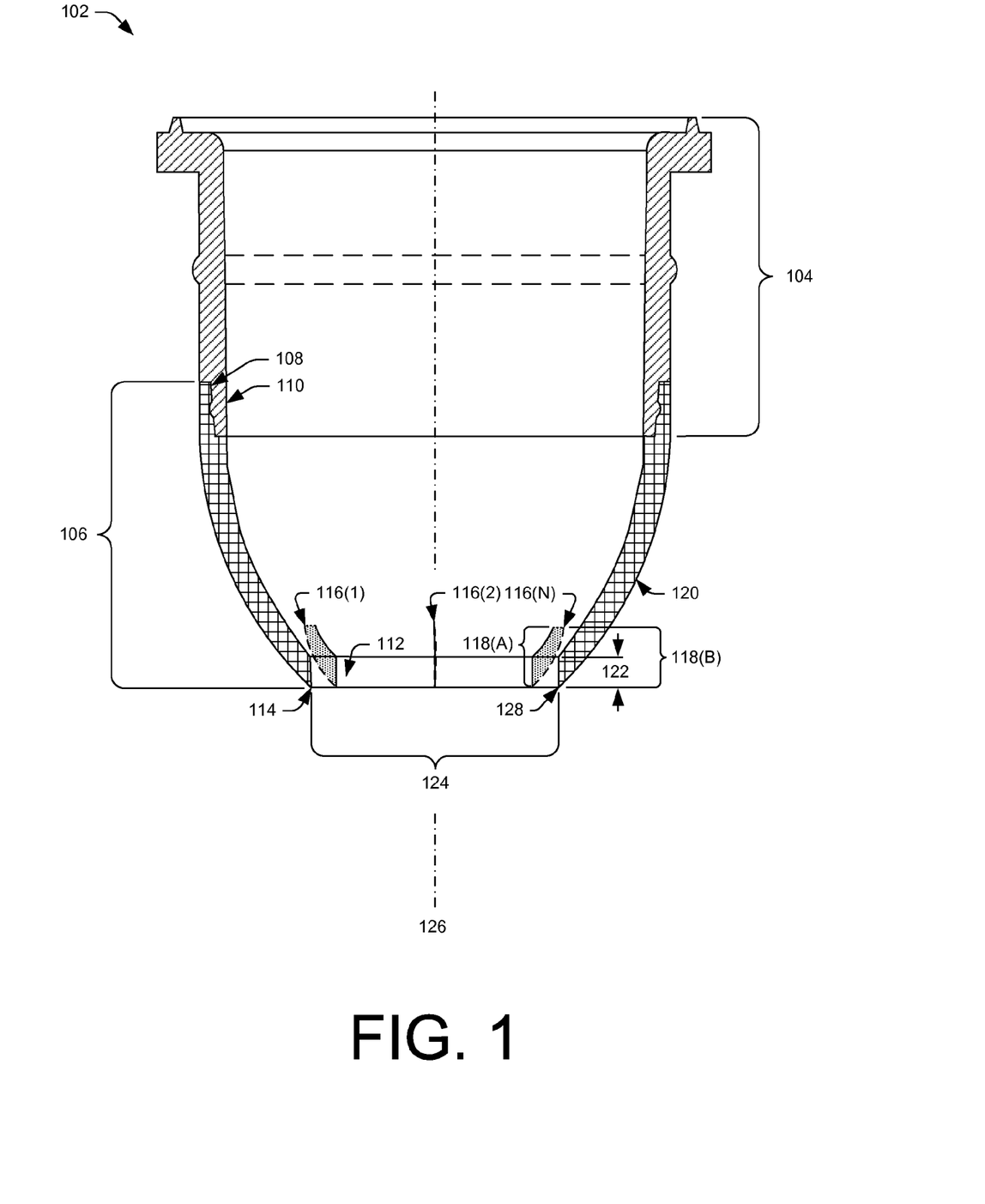
FIG. 1 depicts an illustrative multi-layered wiper for removing a product from an applicator.

FIG. 1 depicts an illustrative multi-layered wiper 102. The multi-layered wiper 102 includes a cylindrical-shaped retention portion 104 formed of a first material and a dome-shaped wiping portion 106 formed of another material, different from the first material. While FIG. 1 depicts a substantially dome-shaped wiping portion 106 comprising an arcuate bottom outside portion, other shapes are contemplated. For example, the wiping portion may be cylindrical-shaped, pyramid-shaped, cone-shaped, or the like, suitable for removing product from an applicator. Here, in FIG. 1, the first material is harder than the second material, and may be configured to provide for assembling the multi-layered wiper 102 to a bottle via a press-fit, snap-fit, threads, or other retention mechanisms. The second softer material, forming the dome-shaped wiping portion 106, may be configured to remove a product from an applicator via a dimensional interference fit between the dome-shaped wiping portion and the applicator. The first material may comprise, for example, polypropylene (PP), acrylonitrile butadiene styrene (ABS), or the like, suitable for being assembled to a bottle and being over-molded onto another material. The second material may comprise, for example, thermoplastic elastomer (TPE), rubber (i.e., natural rubber, or synthetic rubber), polyethylene, silicone, or the like, suitable for removing a product from an applicator (e.g., by being over-molded onto the first material).

In the illustrated embodiment, the dome-shaped wiping portion 106 comprises a top 108 over-molded onto a bottom 110 of the cylindrical-shaped retention portion 104. While FIG. 1 illustrates the top 108 of dome-shaped wiping portion 106 being over-molded onto the bottom 110 of the cylindrical-shaped retention portion 104, other attachment methods are contemplated. For example, the top 108 of dome-shaped wiping portion 106 may be attached to the bottom 110 of the cylindrical-shaped retention portion 104 by way of adhesive, laser weld, sonic welded, or the like, suitable for fixing a first material to another material softer than the first material.

FIG. 1 further illustrates a wiping face 112 arranged on an inside portion of a bottom 114 of the dome-shaped wiping portion 106 for removing a product from a surface of an applicator. While FIG. 1 illustrates a wiping face 112 that is a vertical wiping surface, other wiping surfaces are contemplated. For example, a wiping surface may comprise a beveled surface, a textured surface (e.g., dimples, bumps, or the like), one or more ridges, or the like, suitable for removing product from an applicator.

In the illustrated embodiment, the wiping face 112 further comprises vertical slits 116(1)-(N) arranged through the wiping face 112. Vertical slits 116(1)-(N) are configured for relieving a portion of hoop-stress in the bottom 114 portion of the dome-shaped wiping portion 106, which provides for at least partially removing product from an applicator as it passes through multi-layered wiper 102. Here, FIG. 1 illustrates each of the vertical slits 116(1)-(N) comprising a first edge 118(A) cut in the wiping face 112, and another edge 118(B) cut in an outer surface 120 of the dome-shaped wiping portion 106 that are approximately equal in length. Specifically, FIG. 1 illustrates the first inner edge 118(A), and the other outer edge 118(B) being at least about 1.5 millimeters in length. FIG. 1 further illustrates the wiping face 112 comprising a height 122 of approximately about 0.8 millimeters. While FIG. 1 illustrates vertical slits 116(1)-(N) that cut the full length of the wiping face 112, the vertical slits 116(1)-(N) may alternatively be limited to a lower distal end of the wiping face 112. Further, FIG. 1 illustrates, the vertical slits 116(1)-(N) are arranged uniformly around a circumference 124 of the wiping face 112, which is concentric about a center 126 of the multi-layered wiper 102. Here, an acute wiping tip 128 is illustrated as being arranged around the circumference 124 of the wiping face 112 of the wiping portion 106 defining a termination interface between the wiping face 112 and the outer surface 120. The acute wiping tip 128 is defined by an acute angle formed by an intersection of the vertical wiping surface 112 and the outer surface 120.

In addition, FIG. 1 also illustrates the dome-shaped wiping portion 106 and the cylindrical-shaped retention portion 104 being substantially symmetrical, which are substantially concentric about center 126. While FIG. 1 illustrates the dome-shaped wiping portion 106 as comprising vertical slits 116(1)-(N) arranged on the bottom 114 portion of the dome-shaped wiping portion 106, in other embodiments the dome-shaped wiping portion 106 may omit the vertical slits 116(1)-(N) entirely. Further, dome-shaped wiping portion may comprise any number of vertical slits 116(1)-(N) arranged on the bottom 114 portion of the dome-shaped wiping portion 106. Further, while FIG. 1 illustrates vertical slits 116(1)-(N) that are substantially symmetrical (i.e., first edge 118(A) is substantially equal in length to the other edge 118(B)), the dome-shaped wiping portion 106 may comprise asymmetrical vertical slits. For example, the dome-shaped wiping portion 106 may comprise asymmetrical vertical slits comprising a first edge cut in the wiping face 112, and another edge, shorter than the first edge, cut in the outer surface 120 of the dome-shaped wiping portion 106 (described in further detail with respect to FIG. 3).

Further, while FIG. 1 illustrates a multi-layered wiper 102 comprising a first material over-molded to another material, different from the first material, multi-layered wiper may further comprise an additional material, different from the other two materials. For example, a multi-layered wiper may comprise first, second, and third materials fixed (e.g., over-molded) to each other, where the first material is harder than the second material, and the third material is softer than the second material, or any combination thereof.

Figure 2:
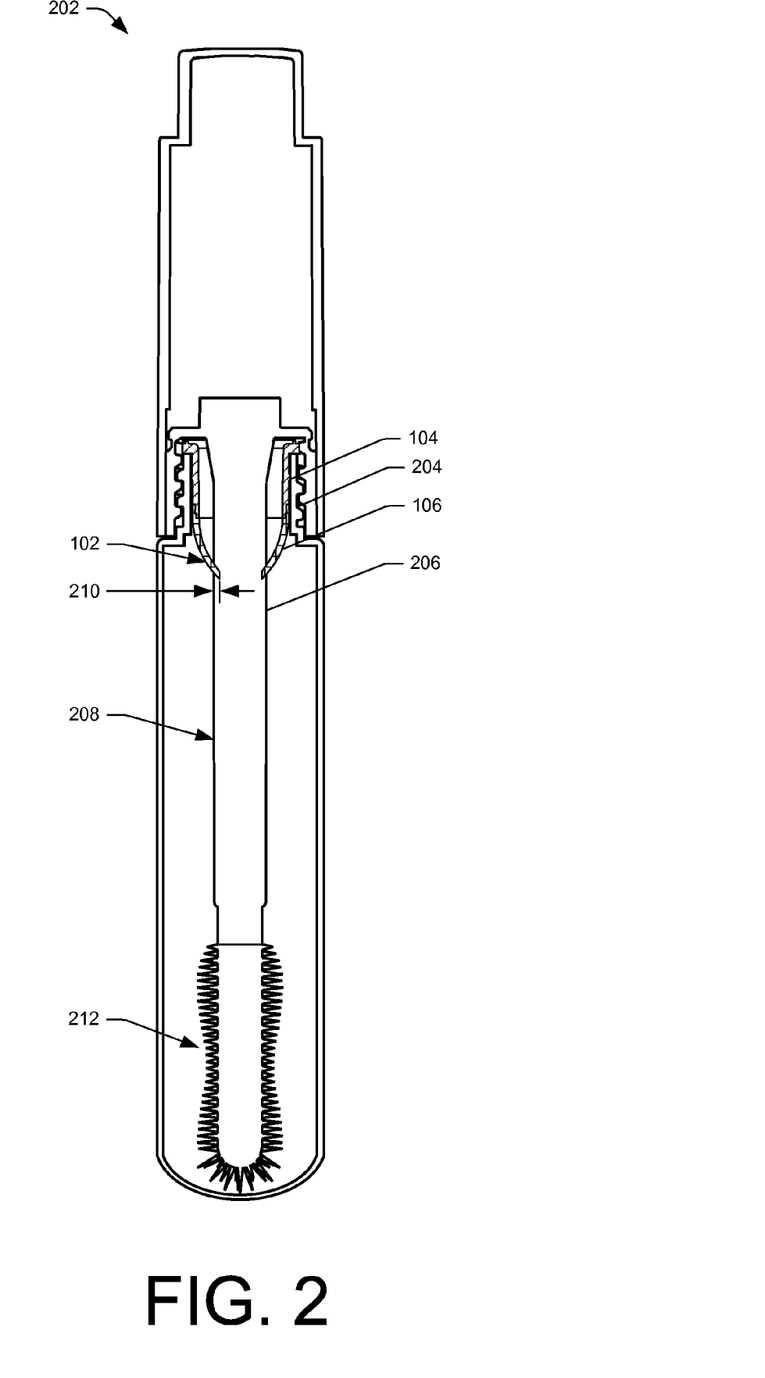
FIG. 2 illustrates a section view of an applicator system having the multi-layered wiper of FIG. 1 assembled in the applicator system.

FIG. 2 illustrates a section view of an applicator system 202 having the multi-layered wiper 102 of FIG. 1 assembled in the applicator system 202. FIG. 2 further illustrates cylindrical-shaped retention portion 104 of the multi-layered wiper 102 being retained in a bottle 204 of the applicator system 202, via a press fit. FIG. 2 further illustrates the dome-shaped wiping portion 106 of the multi-layered wiper 102 squeezing a stem 206 of an applicator 208, via a dimensional interference 210 with the stem 206, when the applicator 208 is received by the multi-layered wiper 102. (Please note that, while wiper 102 is illustrated as occupying a portion space of stem 206, in practice wiper 102 squeezes stem 206 and does not occupy the space of stem 206.) Further, when the applicator 208 is drawn out of the bottle 204, and through the multi-layer wiper 102, the multi-layer wiper 102 removes product from the stem 206, as well as a brush 212 disposed at an end of the stem 206, via the dimensional interference 210. While FIG. 2 illustrates multi-layered wiper 102 squeezing stem 206, multi-layer wiper 102 may not squeeze stem 206. For example, multi-layered wiper 102 may be configured to provide a gap between the stem 206 and the multi-layered wiper 102, while still being configured to squeeze the brush 212 disposed at the end of the stem 206.

Further, as discussed above, with the cylindrical-shaped retention portion 104 being formed of a first material having a hardness (i.e., durometer) suitable for assembling the multi-layered wiper 102 into the bottle 204, cylindrical-shaped retention portion 104 provides for retaining the multi-layered wiper 102 in the bottle 204, via a press fit. Additionally, while the cylindrical-shaped retention portion 104 retains the multi-layered wiper 102 in the bottle 204, the dome-shaped wiping portion 106 formed of a second material having a hardness (i.e., durometer) suitable for at least partially squeezing the applicator 208 provides for wiping product from the stem 206 and/or the brush 212 of applicator 208.

Figure 3:
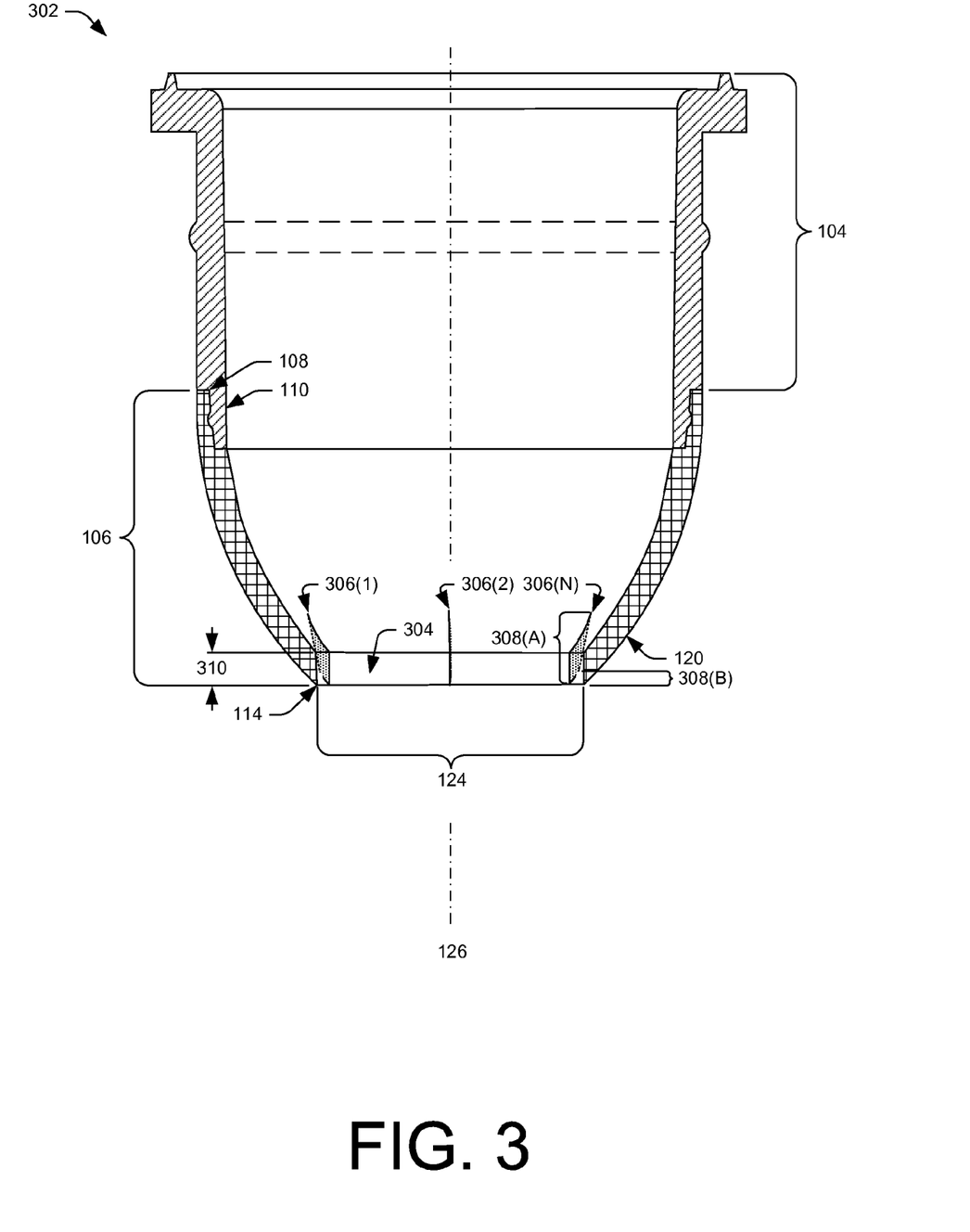
FIG. 3 illustrates an embodiment of a multi-layered wiper comprising a vertical wiping surface having asymmetrical vertical slits.

FIG. 3 illustrates an embodiment of a multi-layered wiper 302 comprising some of the same features as the multi-layered wiper 102 illustrated in FIG. 1. For example, multi-layered wiper 302 is illustrated as comprising a cylindrical-shaped retention portion 104 formed of a first material and a dome-shaped wiping portion 106 formed of another material, different from the first material. In FIG. 3 the top 108 of the dome-shaped wiping portion 106 is illustrated as being over-molded onto the bottom 110 of the cylindrical-shaped retention portion 104. In this embodiment, multi-layered wiper 302 is illustrated as comprising a wiping face 112 having a vertical wiping surface 304 having asymmetrical vertical slits 306(1)-(N). The asymmetrical vertical slits 306(1)-(N) provide for relieving a portion of the hoop-stress associated with the bottom 114 portion of multi-layered wiper 302, which provides for at least partially removing product from an applicator as it passes through the multi-layered wiper 302. As illustrated in FIG. 3, each of the asymmetrical vertical slits 306(1)-(N) comprises a first edge 308(A), cut in the vertical wiping surface 304, and another edge 308(B), shorter than the first edge 308(A) cut in the outer surface 120 of the dome-shaped wiping portion 106. For example, FIG. 3 illustrates the first inner edge 308(A) being at least about 1.5 millimeters in length, and the other outer edge 308(B) being at least about 75% shorter than the first edge 308(A). While FIG. 3 illustrates the other edge 308(B) being about 75% shorter than the first edge 308(A), other length differences are contemplated. For example, the other edge 308(B) may be about 5%, 25%, 95%, or any other length shorter than the first edge 308(A).

FIG. 3 further illustrates the vertical wiping surface 304 as comprising a height 310 of about 0.8 millimeters. While the vertical wiping surface 304 is illustrated as being about 0.8 millimeters high, other heights are contemplated. For example, vertical wiping surface 304 may be 0.2, 0.3, 0.5, 1.5, 2 millimeters high, or any other height, suitable for wiping product from an applicator.

Figure 4:
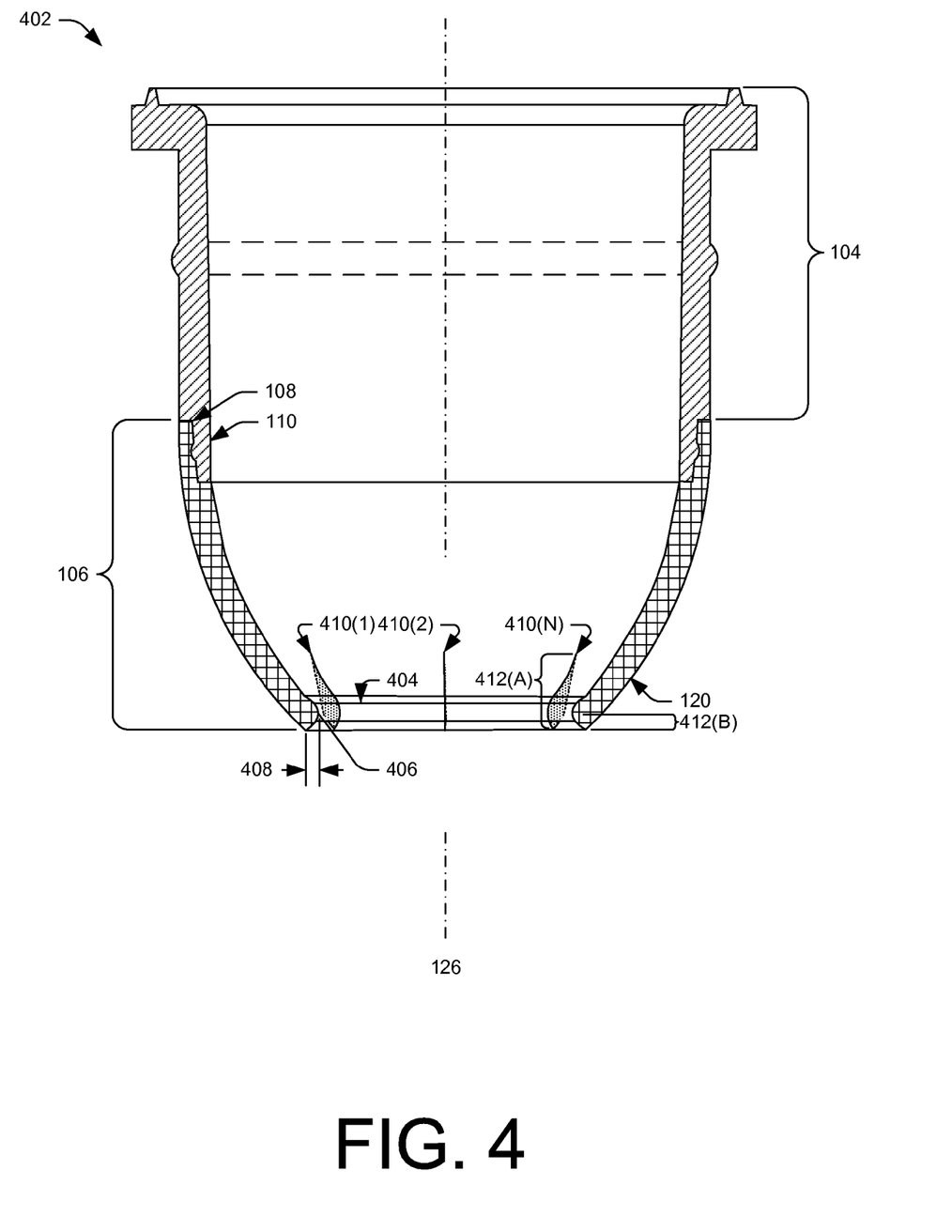
FIG. 4 illustrates another embodiment of a multi-layered wiper comprising a wiping surface comprising a raised ridge, and asymmetrical vertical slits.

FIG. 4 illustrates another embodiment of a multi-layered wiper 402 comprising some of the same features as the multi-layered wiper 302 illustrated in FIG. 3. For example, multi-layered wiper 402 is illustrated as comprising a cylindrical-shaped retention portion 104 formed of a first material and a dome-shaped wiping portion 106 formed of another material, different from the first material. Again, here in FIG. 4 the top 108 of the dome-shaped wiping portion 106 is illustrated as being over-molded onto the bottom 110 of the cylindrical-shaped retention portion 104. Here, in this embodiment, multi-layered wiper 402 is illustrated as comprising a wiping surface 404 having a raised ridge 406 protruding towards the center 126 of the dome-shaped wiping portion 106. While, FIG. 4 illustrates the raised ridge 406 protruding a distance 408 of approximately about 0.8 millimeters towards the center 126 of the dome-shaped wiping portion 106, other distances are contemplated. For example, a raised ridge may protrude approximately about 0.4, 1, 1.5 millimeters, or the like, towards the center 126 of the dome-shaped wiping portion 106. FIG. 4 further illustrates asymmetrical vertical slits 410(1)-(N) arranged through the raised ridge 406. As discussed above, each of the asymmetrical vertical slits 410(1)-(N) comprise a first edge 412(A), cut in the wiping surface 404, and another edge 412(B), shorter than the first edge 412(A), cut in the outer surface 120 of the dome-shaped wiping portion 106. While FIG. 4 illustrates asymmetrical vertical slits 410(1)-(N) arranged through at least a portion of the raised ridge 406, other vertical slits are contemplated. For example, the vertical slits arranged through the raised ridge 406 may be substantially symmetrical (i.e., first edge 412(A) is substantially equal in length to the other edge 412(B)).

Figure 5:
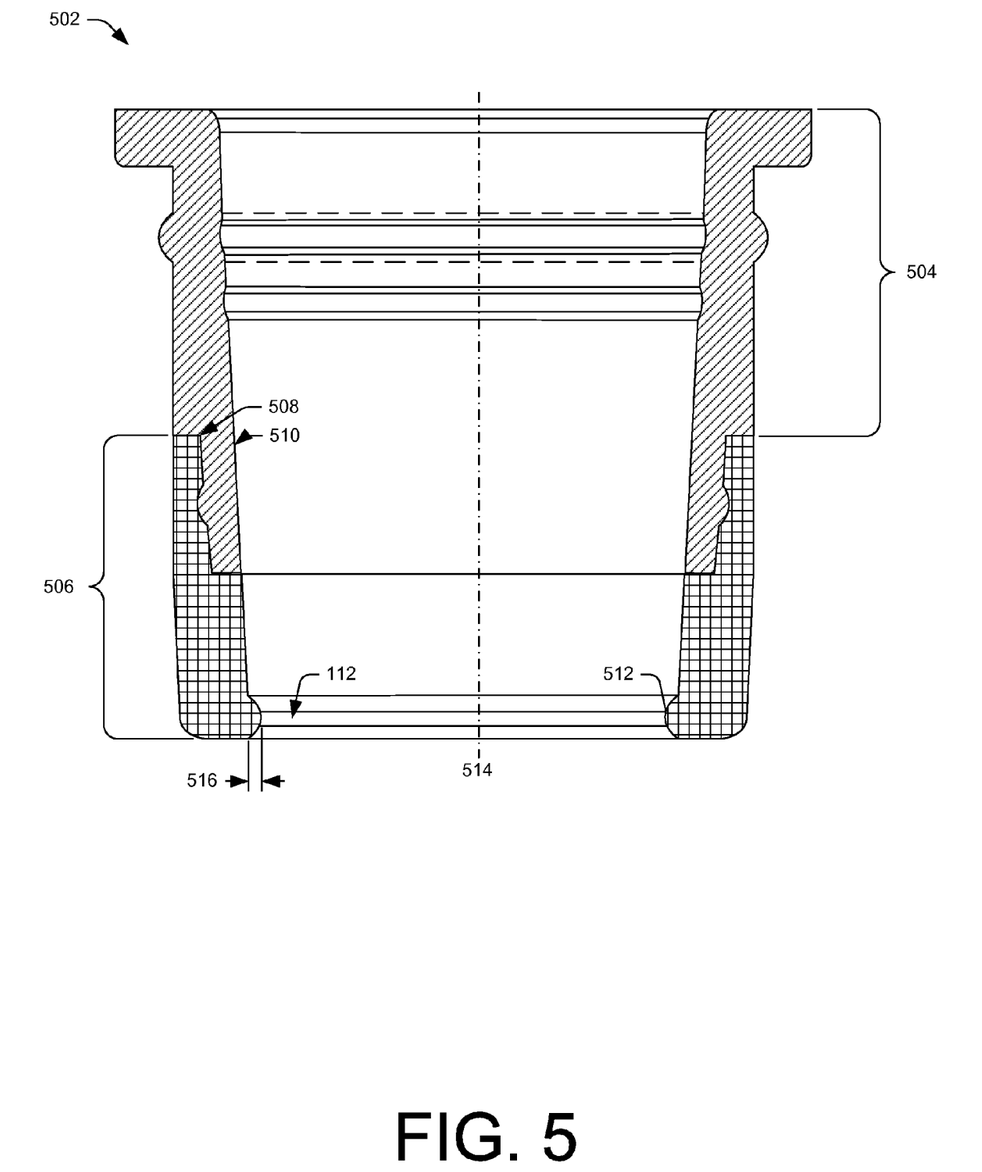
FIG. 5 illustrates another embodiment of a multi-layered wiper comprising a cylindrical-shaped wiping portion and a raised ridge, without vertical slits.

FIG. 5 illustrates another embodiment of a multi-layered wiper 502. FIG. 5 illustrates multi-layered wiper 502 as comprising a cylindrical-shaped retention portion 504 formed of a first material, and a cylindrical-shaped wiping portion 506 formed of another material, different from the first material. Again, here in FIG. 5 a top 508 of the cylindrical-shaped wiping portion 506 is illustrated as being over-molded onto a bottom 510 of the cylindrical-shaped retention portion 504. In this embodiment, multi-layered wiper 502 is illustrated as comprising a wiping face 112 having a raised ridge 512 protruding towards a center 514 of the cylindrical-shaped wiping portion 506. While FIG. 5 illustrates a multi-layered wiper 502 without vertical slits, multi-layered wiper 502 may alternatively include vertical slits. For example, multi-layered wiper 502 may include symmetrical vertical slits (e.g., vertical slits 116(1)-(N)), or asymmetrical vertical slits (e.g., asymmetrical vertical slits 306(1)-(N)), as discussed above. Further, while FIG. 5 illustrates the raised ridge 512 protruding a distance 516 of approximately about 0.8 millimeters towards the center 514 of the cylindrical-shaped wiping portion 506, other distances are contemplated. For example, a raised ridge may protrude approximately about 0.4, 1, 1.5 millimeters, or the like, towards the center 514 of the cylindrical-shaped wiping portion 506.

Example Process for Manufacturing a Multi-Layered Wiper

Figure 6:
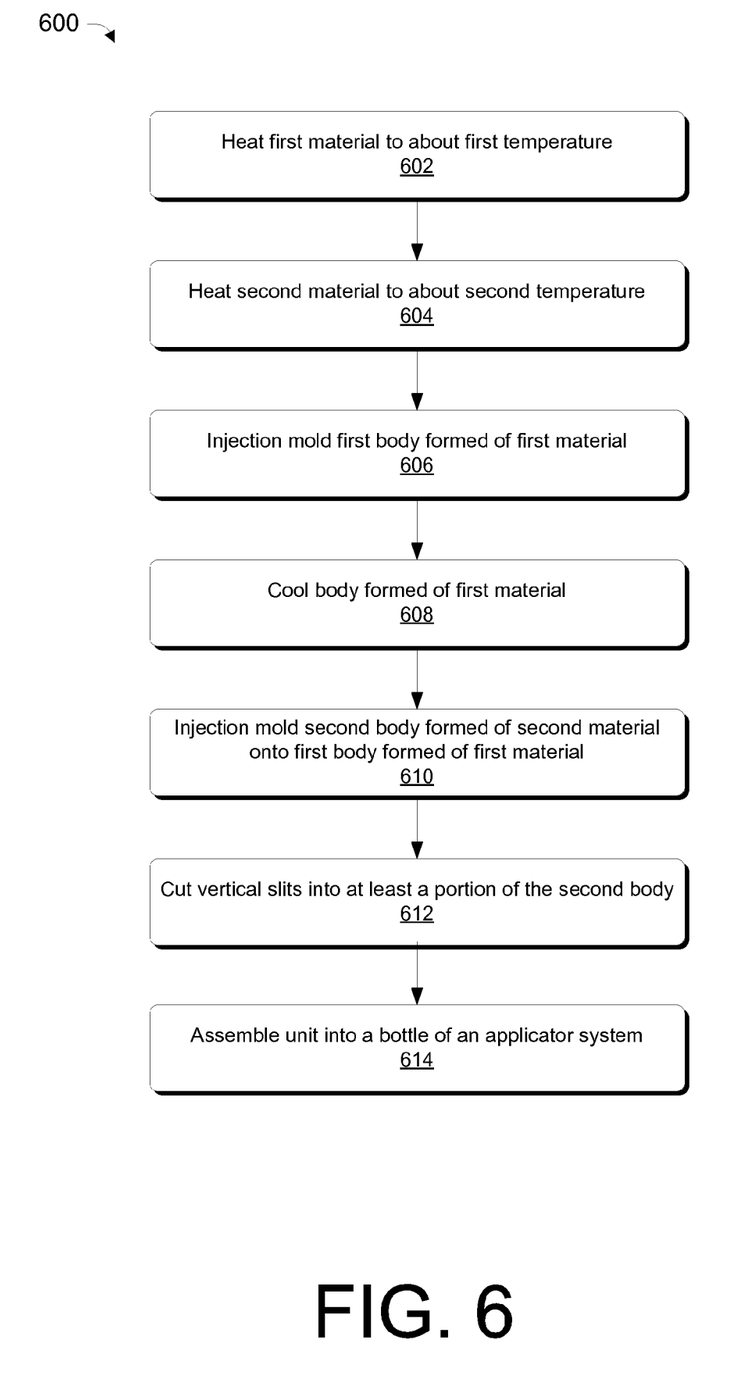
FIG. 6 illustrates an example process for manufacturing a multi-layered wiper for removing a product from an applicator.

FIG. 6 illustrates an example process 600 for manufacturing a multi-layered wiper 102 based at least in part on material characteristics of the particular multi-layered wiper 102. For instance, this process may be performed to manufacture a multi-layered wiper 102 comprising a cylindrical-shaped retention portion 104 formed of polypropylene (PP), and a dome-shaped wiping portion 106 formed of thermoplastic elastomer (TPE). In some instances, the process may be performed at a manufacturing facility and prior to the assembly of the applicator system 202. While FIG. 6 illustrates a process for manufacturing a multi-layered wiper 102 configured to provide exceptional installation characteristics, while simultaneously providing exceptional wiping characteristics, this process may apply to the manufacturing of any type of multi-layered wiper. Additionally, this process may apply to manufacturing any type of multi-layered wiper formed of any other suitable materials capable of being injection over-molded.

Process 600 includes an operation 602, which represents heating a first material (e.g., polypropylene (PP) or acrylonitrile butadiene styrene (ABS)) to a first molding temperature of about 240 degrees Celsius. Next, process 600 proceeds to operation 604, which represents heating a second material (e.g., thermoplastic elastomer (TPE), rubber (i.e., natural rubber, or synthetic rubber), polyethylene, silicone, or the like) to a second molding temperature of about 220 degrees Celsius. In some instances, both of the materials may be heated simultaneously to respective first and second molding temperatures. Process 600 continues to operation 606, where subsequent to at least the heating of the first material, a first body (e.g., a cylindrical-shaped retention portion 104) is formed of the first material via an injection molding process. Operation 606 is followed by operation 608 where the first body formed of the first material is cooled to about room temperature. Following operation 608, at operation 610, and subsequent to the cooling of the first body formed of the first material, a second body (e.g., a dome-shaped wiping portion 106) is formed, and in this instance is formed of the second material. More specifically, the second body is formed, such that it comprises a wiping face (e.g., wiping face 112) arranged on an inside portion of a bottom (e.g., bottom 114) of the second body for removing a product from a surface of an applicator (e.g., applicator 208). Here, however, the injection molding process involves injection over-molding the second material at the second molding temperature onto the first body formed of the first material. In some implementations, the second molding temperature may be about the same as the first molding temperature, in which case the second material fuses with the first material. After operation 610, process 600 continues with operation 612, where the first body and the second body are cooled to about room temperature and subsequent to the cooling of the bodies (e.g., a multi-layered wiper 102), vertical slits (e.g., vertical slits 116(1)-(N)) may be cut through at least a portion of the second body (i.e., wiping face). Here, at operation 612, the cutting of the vertical slits through at least the portion of the second may comprise pressing the multi-layered wiper onto a die to cut the slits. After operation 612, process 600 continues with operation 614, where the bodies may be assembled as a unit into a bottle (e.g., a bottle 204) of an applicator system (e.g., applicator system 202), where the first body provides for retaining the bodies as a unit in the bottle and second body provides for removing product from an applicator.

Example Process for Relieving Hoop-Stress in a Multi-Layered Wiper

Figure 7:
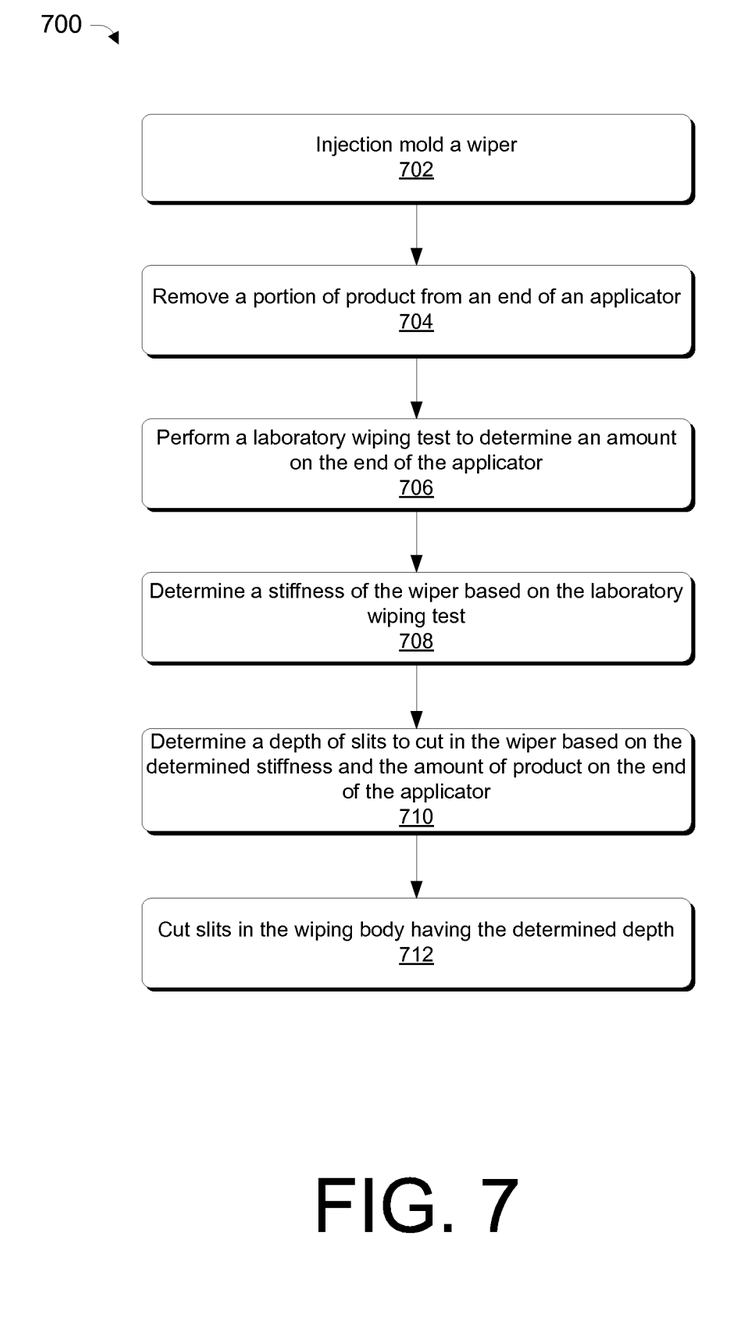
FIG. 7 illustrates an example process for relieving hoop-stress in a wiper.

FIG. 7 illustrates an example process 700 for relieving hoop-stress in a wiper, such as wiper 102. For instance, this process may be performed to cut slits in a wiping body (e.g., dome-shaped wiping portion 106). In some instances, the process may be performed at a manufacturing facility and just prior to the determining of a production ready wiper design. While FIG. 7 illustrates a process for relieving hoop-stress in a wiper (e.g., multi-layered wiper 102) configured to provide exceptional installation characteristics, while simultaneously providing exceptional wiping characteristics, this process may apply to the relieving of hoop-stress in any type of wiper. Additionally, this process may apply to relieving hoop-stress in any type of wiper formed of any suitable materials capable of being injection over-molded.

Process 700 includes an operation 702, which represents injection molding a wiper having a wiping body, the wiping body comprising an acute wiping tip (e.g., acute wiping tip 128) arranged around a circumference (e.g., circumference 124) of an opening of the wiping body. Next, process 700 proceeds to operation 704. Operation 704 represents removing a portion of a product from an end (e.g., brush 212) of an applicator (e.g., applicator 208) via passing the applicator through the wiper. Process 700 continues to operation 706, where subsequent to passing the applicator through the wiper, a laboratory wiping test is performed to determine an amount of the product remaining on the end of the applicator. Operation 706 is followed by operation 708, where a stiffness of the wiper is determined based at least in part on the performed laboratory wiping test. Following operation 708, at operation 710, a depth of slits to cut in the wiper is determined based at least in part on the determined stiffness and the amount of the product remaining on the end of the applicator. Process 700 may be completed at operation 712, which represents cutting slits in the wiping body having the determined depth. Here, the cutting of the slits in the wiping body may comprise pressing the wiper onto a die to cut the slits.

Further, operation 712, may represent cutting vertical slits through at least a portion of a vertical wiping surface (e.g., vertical wiping surface 304). Here, the acute wiping tip arranged around the circumference of the opening of the wiping body defines a termination interface between the vertical wiping face arranged on a bottom inside portion of the wiping body and a bottom outside portion of the wiping body.

Operation 712, may further represent cutting asymmetrical slits based at least in part on the determined stiffness. Here, each of the vertical slits cut in the vertical wiping surface comprise asymmetrical slits and each asymmetrical slit comprises a first edge (e.g., first edge 308(A)) cut in the vertical wiping surface and another edge (e.g., another edge 308(B)) shorter than the first edge cut in the bottom outside portion of the wiping body. The first edge length and the other edge length being based at least in part on the determined stiffness.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. For example, in various embodiments, any of the structural features and/or methodological acts described herein may be rearranged, modified, or omitted entirely. For example, the shape, size, and configuration of the multi-layered wiper may be varied.

What is claimed is:

1. A wiper comprising:
a retention body for fixing the wiper to a bottle of a dispenser, the retention body comprising a hollow elongated cylinder having a top and a bottom; and
a wiping body for removing a portion of a product from an end of an applicator, the wiping body comprising a wiping face arranged on a bottom inside portion of a dome shaped hollow elongated cylinder,
wherein the wiping face arranged on the bottom inside portion of the dome shaped hollow elongated cylinder comprises one single continuous curvilinear shaped portion of the dome shaped hollow elongated cylinder, and wherein slits are arranged through at least a portion of the one single continuous curvilinear shaped wiping face.

2. The wiper of claim 1, wherein the one single continuous curvilinear shaped wiping face arranged on the bottom inside portion of the dome shaped hollow elongated cylinder comprises a vertical wiping surface having the slits arranged through at least a portion of the vertical wiping surface.

3. The wiper of claim 2, wherein the slits are arranged uniformly around a circumference of the vertical wiping surface.

4. The wiper of claim 3, wherein the slits are cut in a lower distal end of the vertical wiping surface.

5. The wiper of claim 4, wherein the slits are at least about 1.5 millimeters in length.

6. The wiper of claim 1, wherein the retention body is made of a material different than a material of the wiping body.

7. The wiper of claim 1, wherein the wiping body is over-molded onto the bottom of the hollow elongated cylinder of the retention body.

8. The wiper of claim 7, wherein the retention body comprises polypropylene (PP) or acrylonitrile butadiene styrene (ABS).

9. The wiper of claim 7, wherein the wiping body comprises thermoplastic elastomer (TPE), rubber, polyethylene, or silicone.

10. A multi-layered wiper comprising:
a cylindrical-shaped retention portion formed of a first material; and
a dome-shaped wiping portion formed of another material, different from the first material, comprising:
a top and a bottom, the top of the dome-shaped wiping portion being over-molded onto a bottom of the cylindrical-shaped retention portion; and
a wiping face arranged on an inside portion of the bottom of the dome-shaped wiping portion for removing a product from a surface of an applicator,
wherein the wiping face arranged on the inside portion of the bottom of the dome-shaped wiping portion comprises one single continuous curvilinear shaped portion of the dome-shaped wiping portion, and wherein vertical slits are arranged through at least a portion of the one single continuous curvilinear shaped wiping face.

11. The multi-layered wiper of claim 10, wherein the first material comprises polypropylene (PP) or acrylonitrile butadiene styrene (ABS).

12. The multi-layered wiper of claim 10, wherein the second material comprises thermoplastic elastomer (TPE), rubber, polyethylene, or silicone.

13. The multi-layered wiper of claim 10, wherein the one single continuous curvilinear shaped wiping face arranged on the inside portion of the bottom of the dome-shaped wiping portion comprises a vertical wiping surface having each of the vertical slits arranged in the vertical wiping surface.

14. The multi-layered wiper of claim 13, wherein each of the vertical slits arranged in the vertical wiping surface comprises an asymmetrical slit comprising a first edge cut in the vertical wiping surface and another edge shorter than the first edge cut in an outer surface of the dome-shaped wiping portion.

15. A wiper comprising:
a retention body for fixing the wiper to a bottle of a dispenser, the retention body comprising a hollow elongated cylinder having a top and a bottom; and
a wiping body coupled to the retention body for removing a portion of a product from an end of an applicator, the wiping body comprising an acute wiping tip arranged around a circumference of an opening of the wiping body, wherein the acute wiping tip arranged around the circumference of the opening of the wiping body comprises one single continuous curvilinear shaped portion of the wiping body, and wherein vertical slits are arranged through the one single continuous curvilinear shaped acute wiping tip.

16. The wiper of claim 15, wherein the one single continuous curvilinear shaped acute wiping tip arranged around the circumference of the opening of the wiping body defines a termination interface between a vertical wiping face arranged on a bottom inside portion of the wiping body and an arcuate bottom outside portion of the wiping body.

17. The wiper of claim 16, wherein the wiping body comprises a substantially dome shaped hollow elongated cylinder.

18. The wiper of claim 16, wherein the vertical slits are arranged through at least a portion of the vertical wiping surface.

19. The wiper of claim 18, wherein the vertical slits are at least about 1.5 millimeters in length.

* * * * *